United States Patent
Kaneko et al.

(10) Patent No.: US 10,435,641 B2
(45) Date of Patent: Oct. 8, 2019

(54) REFRIGERATOR LUBRICATING OIL AND MIXED COMPOSITION FOR REFRIGERATOR

(71) Applicant: IDEMITSU KOSAN CO., LTD., Chiyoda-ku (JP)

(72) Inventors: Masato Kaneko, Ichihara (JP); Tadashi Kisen, Ichihara (JP); Takahiro Hoshida, Kariya (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 15/561,768

(22) PCT Filed: Mar. 10, 2016

(86) PCT No.: PCT/JP2016/057673
§ 371 (c)(1),
(2) Date: Sep. 26, 2017

(87) PCT Pub. No.: WO2016/158306
PCT Pub. Date: Oct. 6, 2016

(65) Prior Publication Data
US 2018/0079982 A1    Mar. 22, 2018

(30) Foreign Application Priority Data

Mar. 30, 2015 (JP) .................................. 2015-070111

(51) Int. Cl.
| | | |
|---|---|---|
| C09K 5/04 | (2006.01) | |
| C10M 105/38 | (2006.01) | |
| C10M 105/14 | (2006.01) | |
| F25B 31/00 | (2006.01) | |
| F25B 1/00 | (2006.01) | |

(52) U.S. Cl.
CPC ............. *C10M 105/38* (2013.01); *C09K 5/04* (2013.01); *C09K 5/045* (2013.01); *C10M 105/14* (2013.01); *F25B 31/002* (2013.01); *C09K 2205/122* (2013.01); *C09K 2205/126* (2013.01); *C09K 2205/22* (2013.01); *C10M 2207/0225* (2013.01); *C10M 2207/2835* (2013.01); *C10N 2240/30* (2013.01); *F25B 1/00* (2013.01); *F25B 2500/16* (2013.01); *F25B 2500/221* (2013.01)

(58) Field of Classification Search
CPC ........ C10M 2207/2835; C10M 105/38; C09K 5/045; C09K 2205/126; C09K 2205/24
See application file for complete search history.

(56) References Cited

U.S. PATENT DOCUMENTS

| | | | |
|---|---|---|---|
| 9,321,948 B2* | 4/2016 | Shimomura | C09K 5/044 |
| 2010/0190672 A1* | 7/2010 | Carr | C10M 171/008 |
| | | | 508/485 |
| 2011/0011123 A1 | 1/2011 | Matsuura et al. | |
| 2012/0024007 A1 | 2/2012 | Ota et al. | |
| 2015/0001438 A1* | 1/2015 | Kishi | C09K 5/041 |
| | | | 252/68 |
| 2015/0008358 A1 | 1/2015 | Okido et al. | |
| 2016/0244692 A1 | 8/2016 | Takahashi et al. | |
| 2018/0044608 A1 | 2/2018 | Kaneko et al. | |

FOREIGN PATENT DOCUMENTS

| | | |
|---|---|---|
| EP | 3 279 295 A1 | 2/2018 |
| JP | 2008-115266 A | 5/2008 |
| JP | 2009-74017 A | 4/2009 |
| JP | 2009-74021 A | 4/2009 |
| JP | WO 2010/029704 * | 3/2010 |
| JP | 2011-190319 A | 9/2011 |
| JP | 2012-31239 A | 2/2012 |
| JP | 2014-194030 A | 10/2014 |
| WO | WO 2013/062058 A1 | 5/2013 |
| WO | WO 2015/050120 A1 | 4/2015 |

OTHER PUBLICATIONS

Extended European Search Report dated Sep. 27, 2018 in Patent Application No. 16772190.1, citing documents AA, AB, AC, AO, and AP therein, 9 pages.
International Search Report dated Apr. 19, 2016, in PCT/JP2016/057673 filed Mar. 10, 2016.
Notice of Reasons for Refusal dated May 14, 2019, in Japanese Patent Application No. 2015-070111 filed Mar. 30, 2015 (with English translation).

* cited by examiner

*Primary Examiner* — John R Hardee
(74) *Attorney, Agent, or Firm* — Oblon, McClelland, Maier & Neustadt, L.L.P.

(57) ABSTRACT

The mixed composition for a refrigerator of the present invention contains: a refrigerant containing at least one unsaturated fluorinated hydrocarbon compound selected from compounds represented by the following molecular formula (1):

$$C_pF_rH_s \qquad (1)$$

wherein p represents an integer of from 2 to 6; r represents an integer of from 1 to 11; and s represents an integer of from 1 to 11, provided that the compound has one or more carbon-carbon unsaturated bond in a molecule, and a refrigerator lubricating oil containing, as a major component, a polyol ester (A) of a fatty acid (a1) that is a fatty acid having a number of carbon atoms of from 9 to 16 and has a content of a fatty acid having a number of carbon atoms of 9 of 50% by mol or more based on the total amount of the fatty acid (a1), and a polyol (a2) that is pentaerythritol and/or dipentaerythritol.

16 Claims, No Drawings

REFRIGERATOR LUBRICATING OIL AND MIXED COMPOSITION FOR REFRIGERATOR

TECHNICAL FIELD

The present invention relates to a refrigerator lubricating oil used for mixing with various refrigerants, and a mixed composition for a refrigerator containing the refrigerator lubricating oil and a refrigerant, and especially relates to a refrigerator lubricating oil applied to a car air-conditioner, such as an electric car air-conditioner and an open type car air-conditioner, and a mixed composition for a refrigerator.

BACKGROUND ART

In general, a refrigerator is constituted by at least a compressor, a condenser, an expansion mechanism (such as an expansion valve), and an evaporator, or furthermore by a dryer, and has a structure that a mixture of a refrigerant and a refrigerator lubricating oil is circulated in the closed system. As the refrigerant for a refrigerator, a chlorine-containing compound, such as a chlorofluorocarbon, has been widely used, but in consideration of the environment protection, it is being replaced by a compound containing no chlorine, such as a hydrofluorocarbon (HFC), and a natural refrigerant, such as carbon dioxide. Examples of the hydrofluorocarbon in practical use include a saturated hydrofluorocarbon (which may be hereinafter referred to as a saturated HFC), which is represented by 1,1,1,2-tetrafluoroethane, difluoromethane, pentafluoroethane, and 1,1,1-trifluoroethane (which may be hereinafter referred to as R134a, R32, R125, and R143a, respectively).

However, as a refrigerant for a car air-conditioner, it is currently difficult to use carbon dioxide requiring high pressure as the major component, and the saturated HFC also has a problem of the high global warming potential. Under the circumstances, it is being considered in recent years to use an unsaturated fluorinated hydrocarbon compound, such as HFO1234ze and HFO1234yf, as a refrigerant capable of being used in a car air-conditioner, irrespective of the low global warming potential thereof.

For a refrigerant containing an unsaturated fluorinated hydrocarbon compound, it is considered to use an oxygen-containing compound, such as a polyoxyalkylene glycol compound, a polyol ester compound, and a polycarbonate compound, as a base oil of a refrigerator lubricating oil.

As the polyol ester-based refrigerator lubricating oil used for a refrigerant containing an unsaturated fluorinated hydrocarbon compound, it has been known to use an ester of pentaerythritol or dipentaerythritol as the base oil. Specifically, it has been known to use a polyol ester formed of pentaerythritol or dipentaerythritol with a mixture of a fatty acid having a number of carbon atoms of 8 and a fatty acid having a number of carbon atoms of 9, a polyol ester formed of pentaerythritol or dipentaerythritol with a fatty acid having a number of carbon atoms of from 5 to 7, and a polyol ester formed of pentaerythritol or dipentaerythritol with a fatty acid having from 14 to 22 carbon atoms (see PTLs 1 to 4).

CITATION LIST

Patent Literatures

PTL 1: JP A 2008-115266 A
PTL 2: JP A 2009-74017 A
PTL 3: JP A 2009-74021 A
PTL 4: JP A 2011-190319 A

SUMMARY OF INVENTION

Technical Problem

However, the ordinary polyol ester-based refrigerator lubricating oil swells various rubber members used in a refrigerator, which may cause a danger of leakage of the refrigerant and leakage of the refrigerator lubricating oil. Furthermore, some of the polyol ester-based refrigerator lubricating oil may have insufficient compatibility with a refrigerant containing an unsaturated fluorinated hydrocarbon compound. Accordingly, with the ordinary polyol ester-based refrigerator lubricating oil, it is difficult to suppress properly the swelling of various rubber members while providing good compatibility with a refrigerant containing an unsaturated fluorinated hydrocarbon compound.

The present invention has been made in consideration of the aforementioned problems, and an object thereof is to provide a refrigerator lubricating oil that is capable of properly suppressing the swelling of various rubber members used in a refrigerator without impairing the compatibility between a refrigerator containing an unsaturated fluorinated hydrocarbon compound and the refrigerator lubricating oil, and to provide a mixed composition for a refrigerator containing the refrigerator lubricating oil and a refrigerant containing an unsaturated fluorinated hydrocarbon compound.

As a result of earnest investigations made by the present inventors, it has been found that a polyol ester-based refrigerator lubricating oil having the particular structure can properly suppress the swelling of various rubber members used in a refrigerator without impairing the compatibility with a refrigerant containing an unsaturated fluorinated hydrocarbon compound, and the present invention described below has been completed. Thus, the present invention provides the following items (1) to (15).

(1) A mixed composition for a refrigerator, containing:
a refrigerant containing at least one unsaturated fluorinated hydrocarbon compound selected from compounds represented by the following molecular formula (1):

$$C_pF_rH_s \qquad (1)$$

wherein p represents an integer of from 2 to 6; r represents an integer of from 1 to 11; and s represents an integer of from 1 to 11, provided that the compound has one or more carbon-carbon unsaturated bond in a molecule, and a refrigerator lubricating oil containing, as a major component, a polyol ester (A) of a fatty acid (a1) that is a fatty acid having a number of carbon atoms of from 9 to 16 and has a content of a fatty acid having a number of carbon atoms of 9 of 50% by mol or more based on the total amount of the fatty acid (a1), and a polyol (a2) that is pentaerythritol and/or dipentaerythritol.

(2) The mixed composition for a refrigerator according to the item (1), wherein the unsaturated fluorinated hydrocarbon compound is a fluoride of propene.

(3) The mixed composition for a refrigerator according to the item (2), wherein the fluoride of propene is at least one selected from isomers of pentafluoropropene, 3,3,3-trifluoropropene, 1,3,3,3-tetrafluoropropene, and 2,3,3,3-tetrafluoropropene.

(4) The mixed composition for a refrigerator according to any one of the items (1) to (3), wherein the refrigerant consists of the unsaturated fluorinated hydrocarbon compound.

(5) The mixed composition for a refrigerator according to any one of the items (1) to (4), wherein the fatty acid (a1) consists of the fatty acid having a number of carbon atoms of 9.

(6) The mixed composition for a refrigerator according to any one of the items (1) to (4), wherein the fatty acid (a1) has a content of the fatty acid having a number of carbon atoms of 9 of 50% by mol or more based on the total amount of the fatty acid (a1), and the balance is a fatty acid having a number of carbon atoms of from 10 to 12.

(7) The mixed composition for a refrigerator according to any one of the items (1) to (6), wherein the fatty acid having a number of carbon atoms of from 9 to 16 contains a branched fatty acid.

(8) The mixed composition for a refrigerator according to any one of the items (1) to (7), wherein the mixed composition for a refrigerator is used for a refrigerator having provided therein a rubber member selected from hydrogenated nitrile rubber (H-NBR), nitrile rubber (NBR), chloroprene rubber (CR), an ethylene-propylene-diene terpolymer (EPDM), silicone rubber, butyl rubber (IIR), styrene-butadiene rubber (SBR), urethane rubber (U), chlorosulfonated polyethylene (CSM), and fluorine rubber (FKM).

(9) The mixed composition for a refrigerator according to any one of the items (1) to (8), wherein the refrigerator lubricating oil contains at least one additive selected from an extreme pressure agent, an oily agent, an antioxidant, an acid scavenger, and a defoaming agent.

(10) The mixed composition for a refrigerator according to any one of the items (1) to (3) and (5) to (9), wherein the refrigerant further contains a saturated fluorinated hydrocarbon compound, and the saturated fluorinated hydrocarbon compound is at least one selected from 1,1-difluoroethane, trifluoroethane, tetrafluoroethane, and pentafluoroethane.

(11) The mixed composition for a refrigerator according to any one of the items (1) to (10), wherein the mixed composition for a refrigerator is used for a refrigerator system, a hot water supply system, or a heating system selected from a car air-conditioner, a gas heat pump system, an air conditioner, a refrigerating chamber, an automatic vending machine, a showcase, a hot water supplier, and a floor heating system.

(12) The mixed composition for a refrigerator according to the item (11), wherein the system has a water content therein of 300 ppm by mass or less and a residual air partial pressure therein of 10 kPa or less.

(13) A refrigerator lubricating oil that is used for a refrigerant containing at least one unsaturated fluorinated hydrocarbon compound selected from compounds represented by the following molecular formula (1):

$$C_pF_rH_s \quad (1)$$

wherein p represents an integer of from 2 to 6; r represents an integer of from 1 to 11; and s represents an integer of from 1 to 11, provided that the compound has one or more carbon-carbon unsaturated bond in a molecule, the refrigerator lubricating oil containing, as a major component, a polyol ester (A) of a fatty acid (a1) that is a fatty acid having a number of carbon atoms of from 9 to 16 and has a content of a fatty acid having a number of carbon atoms of 9 of 50% by mol or more based on the total amount of the fatty acid (a1), and a polyol (a2) that is pentaerythritol and/or dipentaerythritol.

(14) A lubricating method containing using a refrigerator lubricating oil in a refrigerator using a refrigerant containing at least one unsaturated fluorinated hydrocarbon compound selected from compounds represented by the following molecular formula (1):

$$C_pF_rH_s \quad (1)$$

wherein p represents an integer of from 2 to 6; r represents an integer of from 1 to 11; and s represents an integer of from 1 to 11, provided that the compound has one or more carbon-carbon unsaturated bond in a molecule, the refrigerator lubricating oil containing, as a major component, a polyol ester (A) of a fatty acid (a1) that is a fatty acid having a number of carbon atoms of from 9 to 16 and has a content of a fatty acid having a number of carbon atoms of 9 of 50% by mol or more based on the total amount of the fatty acid (a1), and a polyol (a2) that is pentaerythritol and/or dipentaerythritol.

(15) A refrigerator containing:
a refrigerant containing at least one unsaturated fluorinated hydrocarbon compound selected from compounds represented by the following molecular formula (1):

$$C_pF_rH_s \quad (1)$$

wherein p represents an integer of from 2 to 6; r represents an integer of from 1 to 11; and s represents an integer of from 1 to 11, provided that the compound has one or more carbon-carbon unsaturated bond in a molecule, and a refrigerator lubricating oil containing, as a major component, a polyol ester (A) of a fatty acid (a1) that is a fatty acid having a number of carbon atoms of from 9 to 16 and has a content of a fatty acid having a number of carbon atoms of 9 of 50% by mol or more based on the total amount of the fatty acid (a1), and a polyol (a2) that is pentaerythritol and/or dipentaerythritol.

Advantageous Effects of Invention

According to the present invention, the swelling of various rubber members used in a refrigerator due to the refrigerator lubricating oil and the mixed composition for a refrigerator can be properly suppressed without impairing the compatibility between a refrigerator containing an unsaturated fluorinated hydrocarbon compound and the refrigerator lubricating oil.

DESCRIPTION OF EMBODIMENTS

Preferred embodiments of the present invention will be described in detail below.

The refrigerator lubricating oil according to the present invention is used for the following refrigerant. The mixed composition for a refrigerator according to the present invention contains the refrigerator lubricating oil and the refrigerant. The refrigerant and the refrigerator lubricating oil will be described in more detail below.

<Refrigerant>

The refrigerant according to the present invention contains at least one unsaturated fluorinated hydrocarbon compound selected from compounds represented by the following molecular formula (1):

$$C_pF_rH_s \quad (1)$$

wherein p represents an integer of from 2 to 6; r represents an integer of from 1 to 11; and s represents an integer of from 1 to 11, provided that the compound has one or more carbon-carbon unsaturated bond in a molecule.

The molecular formula (1) shows the kinds and the numbers of the elements in the molecule, and the formula (1) represents an unsaturated fluorinated hydrocarbon compound having a number p of carbon atoms C of from 2 to 6. With having a number of carbon atoms of from 2 to 6, the unsaturated fluorinated hydrocarbon compound can have physical and chemical properties, such as a boiling point, a freezing point, and an evaporation latent heat, that are required for a refrigerant.

In the molecular formula (1), the bond types of the p carbon atoms represented by $C_p$ include a carbon-carbon single bond and an unsaturated bond, such as a carbon-carbon double bond. The carbon-carbon unsaturated bond is preferably a carbon-carbon double bond from the standpoint of the stability, and the unsaturated fluorinated hydrocarbon compound preferably has 1 or more unsaturated bond, such as a carbon-carbon double bond, in the molecule thereof, with the number thereof being preferably 1. Namely, at least one of the bond types of the p carbon atoms represented by $C_p$ is more preferably a carbon-carbon double bond.

Preferred examples of the unsaturated fluorinated hydrocarbon compound include fluorinated compounds of a linear or branched olefin having a number of carbon atoms of from 2 to 6 and a cyclic olefin having a number of carbon atoms of from 4 to 6.

Specific examples thereof include a fluorinated compound of ethylene having from 1 to 3 fluorine atoms introduced therein, a fluorinated compound of propene having from 1 to 5 fluorine atoms introduced therein, a fluorinated compound of butene having from 1 to 7 fluorine atoms introduced therein, a fluorinated compound of pentene having from 1 to 9 fluorine atoms introduced therein, a fluorinated compound of hexene having from 1 to 11 fluorine atoms introduced therein, a fluorinated compound of cyclobutene having from 1 to 5 fluorine atoms introduced therein, a fluorinated compound of cyclopentene having from 1 to 7 fluorine atoms introduced therein, and a fluorinated compound of cyclohexene having from 1 to 9 fluorine atoms introduced therein.

Among these unsaturated fluorinated hydrocarbon compounds, a fluorinated compound of propene is preferred, a propene compound having from 3 to 5 fluorine atoms introduced therein is more preferred, and preferred specific examples thereof include isomers of pentafluoropropene, 3,3,3-trifluoropropene, 1,3,3,3-tetrafluoropropene represented by HFO1234ze, and 2,3,3,3-tetrafluoropropene represented by HFO1234yf.

Among these, a propene compound having 4 fluorine atoms introduced therein is more preferred, and 2,3,3,3-tetrafluoropropene represented by HFO1234yf is particularly preferred.

In the present invention, the unsaturated fluorinated hydrocarbon compound may be used solely or as a combination of two or more kinds thereof.

[Additional Component]

In the present invention, the refrigerant may be a mixed refrigerant that contains an additional component in addition to the unsaturated fluorinated hydrocarbon compound as necessary, and for example, may contain a saturated fluorinated hydrocarbon compound.

The saturated fluorinated hydrocarbon compound is preferably a fluorinated compound of an alkane having a number of carbon atoms of from 2 to 4, and examples thereof include trifluoroethane, such as 1,1-difluoroethane (R152a), 1,1,1-trifluoroethane (R143a), and 1,1,2-trifluoroethane (R143), tetrafluoroethane, such as 1,1,1,2-tetrafluoroethane (R134a) and 1,1,2,2-tetrafluoroethane (R134), and pentafluoroethane, such as 1,1,1,2,2-pentafluoroethane (R125), which are a fluorinated compound of an ethane. The saturated fluorinated hydrocarbon compound may be used solely or as a combination of two or more kinds thereof.

The refrigerant may contain carbon dioxide, and in this case, the refrigerant preferably contains the unsaturated fluorinated hydrocarbon compound, carbon dioxide, and an additional third component. Specifically, the refrigerant preferably contains 1,3,3,3-tetrafluoropropene (HFO1234ze), carbon dioxide (R744), and the third component that is selected from difluoromethane (R32), 1,1-difluoroethane (R152a), fluoroethane (R161), 1,1,1,2-tetrafluoroethane (R134a), propylene, propane, and mixtures thereof.

The refrigerant preferably contains the unsaturated fluorinated hydrocarbon compound represented by the molecular formula (1) as a major component. The term "containing as a major component" means that the refrigerant contains the compound in an amount of 60% by mass or more based on the total amount of the refrigerant, and the content thereof is preferably 70% by mass or more, more preferably 80% by mass or more, and further preferably 90% by mass or more, based on the total amount of the refrigerant. The additional component, such as the saturated fluorinated hydrocarbon compound, is preferably not blended, and the refrigerant preferably consists of the unsaturated fluorinated hydrocarbon compound.

<Refrigerator Lubricating Oil>

The refrigerator lubricating oil of the present invention contains a polyol ester (A) as a major component. The polyol ester (A) will be described in more detail below.

[Polyol Ester (A)] (Base Oil)

The polyol ester (A) is a polyol ester of a fatty acid (a1) that is a fatty acid having a number of carbon atoms of from 9 to 16 and has a content of a fatty acid having a number of carbon atoms of 9 of 50% by mol or more based on the total amount of the fatty acid (a1), and a polyol (a2) that is pentaerythritol and/or dipentaerythritol. More specifically, in the polyol ester (A), the fatty acid (a1) consists of a fatty acid having a number of carbon atoms of 9, or contains a fatty acid having a number of carbon atoms of 9 in an amount of 60% by mol or more based on the total amount of the fatty acid (a1) with the balance being a fatty acid having a number of carbon atoms of from 10 to 16.

The use of the polyol ester (A) in the refrigerator lubricating oil may improve the compatibility thereof with the refrigerant containing the unsaturated fluorinated hydrocarbon compound, and can easily suppress the swelling of rubber members used in a refrigerator. The fatty acid (a1) preferably consists of a fatty acid having a number of carbon atoms of 9 from the standpoint of the further enhancement of the compatibility, and preferably contains a fatty acid having a number of carbon atoms of from 10 to 16 from the standpoint of the well balanced enhancement of the compatibility and the effect of suppressing the swelling of rubber members.

Examples of the fatty acid having a number of carbon atoms of 9 in the fatty acid (a1) include a linear fatty acid, such as n-nonanoic acid, and a branched fatty acid, such as a branched nonanoic acid. Among these, a branched fatty acid is preferred, and in the branched fatty acid, 3,5,5-trimethylhexanoic acid is more preferred, from the standpoint that the swelling of rubber members can be properly suppressed while providing good compatibility with the refrigerant containing the unsaturated fluorinated hydrocarbon compound.

Examples of the fatty acid having a number of carbon atoms of from 10 to 16 in the fatty acid (a1) include a linear fatty acid, such as n-decanoic acid, n-undecanoic acid, lauric acid (n-dodecanoic acid), n-tridecanoic acid, myristic acid (n-tetradecanoic acid), n-pentadecanoic acid, and palmitic acid (n-hexadecanoic acid); and a branched fatty acid, such as a branched decanoic acid represented by neodecanoic acid, a branched undecanoic acid, a branched dodecanoic acid represented by 2-butyloctanoic acid, a branched tridecanoic acid, a branched tetradecanoic acid, a branched pentadecanoic acid, and a branched hexadecanoic acid represented by isopalmitic acid.

The fatty acid having a number of carbon atoms of from 10 to 16 is preferably a branched fatty acid from the standpoint of the proper enhancement of the compatibility and the effect of suppressing the swelling of rubber members. In particular, neodecanoic acid is more preferred since the compatibility and the effect of suppressing the swelling of rubber members can be easily exhibited. Furthermore, from the standpoint of the enhancement of the viscosity characteristics in addition to the compatibility and the effect of suppressing the swelling of rubber members, 2-butyloctanoic acid, isopalmitic acid, and the like are more preferred, and among these, 2-butyloctanoic acid is further preferred.

As described above, the fatty acid (a1), i.e., the fatty acid having a number of carbon atoms of 9 and/or the fatty acid having a number of carbon atoms of from 10 to 16, preferably contains a branched fatty acid. For example, the fatty acid having a number of carbon atoms of 9 contained in the fatty acid (a1) preferably contains a branched fatty acid in an amount of 50% by mol or more, more preferably 70% by mol or more, and further preferably 90% by mol or more, based on the total amount of the fatty acid having a number of carbon atoms of 9, and particularly preferably is entirely a branched fatty acid. Similarly, the fatty acid having a number of carbon atoms of from 10 to 16 contained in the fatty acid (a1) preferably contains a branched fatty acid in an amount of 50% by mol or more, more preferably 70% by mol or more, and further preferably 90% by mol or more, based on the total amount of the fatty acid having a number of carbon atoms of from 10 to 16, and particularly preferably is entirely a branched fatty acid.

In the case where the fatty acid (a1) has a content of the fatty acid having a number of carbon atoms of 9 of 50% by mol or more based on the total amount of the fatty acid (a1), and the balance is a fatty acid having a number of carbon atoms of from 10 to 16, the content of the fatty acid having a number of carbon atoms of 9 is preferably 60% by mol or more based on the total amount of the fatty acid (a1) from the standpoint of the well balanced enhancement of the compatibility and the effect of suppressing the swelling of rubber members while providing good viscosity characteristics.

In the case where the fatty acid (a1) contains a fatty acid having a number of carbon atoms of from 13 to 16, the content of the fatty acid having a number of carbon atoms of from 13 to 16 is preferably 30% by mol or less, and more preferably from 1 to 25% by mol, based on the total amount of the fatty acid (a1). In the case where a fatty acid having a relatively large number of carbon atoms is used, accordingly, the amount thereof used is preferably suppressed since the compatibility can be easily enhanced while properly suppressing the swelling of rubber members.

In the case where the fatty acid (a1) contains a fatty acid having a number of carbon atoms of from 10 to 12, the content of the fatty acid having a number of carbon atoms of from 10 to 12 suffices to be 50% by mol or less, and is preferably approximately from 10 to 40% by mol, based on the total amount of the fatty acid (a1).

The fatty acid (a1) preferably has a content of the fatty acid having a number of carbon atoms of 9 of 50% by mol or more based on the total amount of the fatty acid (a1), and the balance is preferably the fatty acid having a number of carbon atoms of from 10 to 12. When the fatty acid having a number of carbon atoms of from 10 to 16 contained in the fatty acid (a1) has a relatively small number of carbon atoms, accordingly, the compatibility and the effect of suppressing the swelling of rubber members can be enhanced in a well balanced manner.

The polyol ester (A) may be an ester containing an ester of pentaerythritol or dipentaerythritol solely as the polyol (a2), or may be a mixture of esters of the two kinds of polyols, and preferably contains an ester of pentaerythritol, and more preferably contains an ester of pentaerythritol solely, from the standpoint of the enhancement of the compatibility. The polyol ester (A) preferably contains an ester of dipentaerythritol from the standpoint of properly suppressing the swelling of rubber members.

In the case of the mixture of esters of the two kinds of polyols, the amount of the ester of pentaerythritol is preferably larger than the amount of the ester of dipentaerythritol on molar basis, and the molar ratio of the ester of pentaerythritol with respect to the ester of dipentaerythritol (pentaerythritol/dipentaerythritol) is more preferably from 95/5 to 60/40.

In the case where the fatty acid (a1) has a content of the fatty acid having a number of carbon atoms of 9 of 50% by mol or more based on the total amount of the fatty acid (a1), and the balance is a fatty acid having a number of carbon atoms of from 10 to 16, the fatty acid (a1) eventually contains two or more kinds of fatty acids. In this case, the polyol ester (A) may be a mixture of two or more kinds of the esters each of one kind of the fatty acid and the polyol, but is preferably an ester of the mixed fatty acid containing two or more kinds thereof and the polyol since excellent low temperature characteristics and excellent compatibility with a refrigerant may be obtained.

The polyol ester (A) may be a partial ester with all the hydroxyl groups of the polyol that are not entirely esterified, a full ester with all the hydroxyl groups that are esterified, or a mixture of the partial ester and the full ester, and is preferably the full ester.

The polyol ester (A) preferably has a 40° C. kinetic viscosity of from 30 to 500 $mm^2/s$, and more preferably from 40 to 200 $mm^2/s$. The 100*C kinetic viscosity thereof is not particularly limited, and is preferably from 5 to 50 $mm^2/s$, and more preferably from 8 to 25 $mm^2/s$.

The viscosity index thereof is not particularly limited, and is preferably 40 or more, more preferably 60 or more, and particularly preferably 80 or more, from the standpoint of providing good viscosity characteristics. The upper limit of the viscosity index is not particularly limited, and is generally approximately 200 or less.

The polyol ester (A) preferably has a hydroxyl value of 5 mgKOH/g or less. When the hydroxyl value is 5 mgKOH/g or less, the decomposition of the polyol ester (A) may be properly suppressed to provide good stability of the refrigerator lubricating oil. In this point of view, the hydroxyl value of the polyol ester (A) is preferably 4 mgKOH/g or less, and more preferably 3.5 mgKOH/g or less. The hydroxyl value herein is measured by the neutralization titration method according to JIS K0070.

The polyol ester (A) preferably has an acid value of 0.1 mgKOH/g or less, and more preferably 0.05 mgKOH/g or less, from the standpoint of suppressing the decomposition thereof to enhance the stability of the refrigerator lubricating oil. The acid value herein is measured by the indicator method according to the "lubricating oil neutralization test method" defined in JIS K2501.

The fact that the refrigerator lubricating oil contains the polyol ester (A) as a major component means that the polyol ester (A) is contained in an amount of 50% by mass or more based on the total amount of the refrigerator lubricating oil, and the content thereof is preferably 70% by mass or more, more preferably 80% by mass or more, and further preferably 90% by mass or more, based on the total amount of the refrigerator lubricating oil.

The base oil used in the refrigerator lubricating oil preferably consists of the polyol ester (A). A base oil other than the polyol ester (A) may also be contained in such a range that does not impair the effects of the present invention. Examples of the base oil other than the polyol ester (A) include a polyester compound other than the polyol ester (A), a polyoxyalkylene glycol compound, a polyvinyl ether compound, a copolymer of a poly(oxy)alkylene glycol or a monoether thereof and a polyvinyl ether, a polycarbonate compound, and a hydrogenated product of an α-olefin oligomer, and also include a mineral oil, an alicyclic hydrocarbon compound, and an alkylated aromatic hydrocarbon compound.

Examples of the polyester compound other than the polyol ester (A) include a polyol ester of a dihydric to eicosahydric alcohol, preferably a dihydric to decahydric alcohol, and a fatty acid.

[Additives]

The refrigerator lubricating oil of the present invention may contain, in addition to the base oil, at least one additive selected from an extreme pressure agent, an oily agent, an antioxidant, an acid scavenger, a defoaming agent, and the like.

Examples of the extreme pressure agent include a phosphorus extreme pressure agent, such as a phosphate ester, an acidic phosphate ester, a phosphite ester, an acidic phosphite ester, and amine salts thereof.

In the phosphorus extreme pressure agent, tricresyl phosphate, trithiophenyl phosphate, tri(nonylphenyl) phosphite, dioleyl hydrogen phosphite, 2-ethylhexyldiphenyl phosphite, and the like are particularly preferred from the standpoint of the extreme pressure property, the frictional characteristics, and the like.

Examples of the extreme pressure agent also include a metal salt of a carboxylic acid. The metal salt of a carboxylic acid referred herein is preferably a metal salt of a carboxylic acid having a number of carbon atoms of from 3 to 60, and further a fatty acid having a number of carbon atoms of from 3 to 30, and particularly from 12 to 30. Examples thereof also include metal salts of a dimer acid and a trimer acid of the fatty acid, and a dicarboxylic acid having a number of carbon atoms of from 3 to 30. Among these, metal salts of a fatty acid having a number of carbon atoms of from 12 to 30 and a dicarboxylic acid having a number of carbon atoms of from 3 to 30 are particularly preferred.

The metal constituting the metal salt is preferably an alkali metal or an alkaline earth metal, and particularly an alkali metal may be optimum.

Examples of the extreme pressure agent other than those described above include a sulfur extreme pressure agent, such as a sulfurized oil or fat, a sulfurized fatty acid, a sulfurized ester, a thiocarbamate compound, a thioterpene compound, and a dialkyl thiodipropionate compound.

The amount of the extreme pressure agent blended thereto is generally from 0.001 to 5% by mass, and particularly from 0.005 to 3% by mass, based on the total amount of the refrigerator lubricating oil, from the standpoint of the lubricating property and the stability.

The extreme pressure agent may be used solely or as a combination of two or more kinds thereof.

Examples of the oily agent include an aliphatic saturated or unsaturated monocarboxylic acid, such as stearic acid and oleic acid, a polymerized fatty acid, such as a dimer acid and a hydrogenated dimer acid, a hydroxyfatty acid, such as ricinoleic acid and 12-hydroxystearic acid, an aliphatic saturated or unsaturated monohydric alcohol, such as lauryl alcohol and oleyl alcohol, an aliphatic saturated or unsaturated monoamine, such as stearylamine and oleylamine, and an aliphatic saturated or unsaturated monocarboxylic acid amide, such as lauric acid amide and oleic acid amid.

These compounds may be used solely or as a combination of two or more kinds thereof. The amount thereof blended is generally selected from a range of from 0.01 to 10% by mass, and preferably from 0.1 to 5% by mass, based on the total amount of the refrigerator lubricating oil.

As the antioxidant, a phenol antioxidant, such as 2,6-di-tert-butyl-4-methylphenol, 2,6-di-tert-butyl-4-ethylphenol, and 2,2'-methylenebis(4-methyl-6-tert-butylphenol), or an amine antioxidant, such as phenyl-α-naphthylamine and N,N'-diphenyl-p-phenylenediamine is preferably blended. The amount of the antioxidant blended is generally from 0.01 to 5% by mass, and preferably from 0.05 to 3% by mass, based on the total amount of the refrigerator lubricating oil, from the standpoint of the effect and the economic efficiency.

Examples of the acid scavenger include an epoxy compound, such as phenyl glycidyl ether, an alkyl glycidyl ether, an alkylene glycol glycidyl ether, cyclohexene oxide, an α-olefin oxide and an epoxidized soybean oil. Among these, phenyl glycidyl ether, an alkyl glycidyl ether, an alkylene glycol glycidyl ether, cyclohexene oxide, and an α-olefin oxide are preferred from the standpoint of the compatibility.

The alkyl group of the alkyl glycidyl ether and the alkylene group of the alkylene glycol glycidyl ether each may have a branch, and each generally has a number of carbon atoms of from 3 to 30, preferably from 4 to 24, and particularly from 6 to 16. The α-olefin oxide used generally has a total number of carbon atoms of from 4 to 50, preferably from 4 to 24, and particularly from 6 to 16. In the present invention, the acid scavenger may be used solely or as a combination of two or more kinds thereof. The amount thereof blended is generally from 0.005 to 5% by mass, and particularly preferably from 0.05 to 3% by mass, based on the total amount of the refrigerator lubricating oil, from the standpoint of the effect and the prevention of sludge generated.

In the present invention, the use of the acid scavenger blended can enhance the stability of the refrigerator lubricating oil. The combination use thereof with the extreme pressure agent and the antioxidant can exhibit an effect of further enhancing the stability.

Examples of the defoaming agent include a silicone oil and a fluorinated silicone oil.

Other known additives may be blended to the refrigerator lubricating oil of the present invention in such a range that does not impair the objects of the present invention.

The refrigerator lubricating oil may be mixed with a refrigerant to form a mixed composition for a refrigerator, which may be used in a refrigerator. In the mixed composition for a refrigerator, the mass ratio of the refrigerant with respect to the refrigerator lubricating oil (refrigerant/refrigerator lubricating oil) is preferably in a range of from 99/1 to 10/90, more preferably from 95/5 to 30170, and further preferably from 95/5 to 40160.

The mass ration within the range can provide a good refrigeration capability and a lubricating performance in a well balanced manner.

[Lubricating Method and Refrigerator]

The lubricating method of the present invention is a lubricating method containing using the aforementioned refrigerator lubricating oil in a refrigerator using the aforementioned refrigerant.

The refrigerator contains the refrigerant and the refrigerator lubricating oil mixed with the refrigerant, and any device constituting the refrigerator contains a rubber member that is in contact with the mixed composition for a refrigerator or the refrigerator lubricating oil. While the rubber member is in contact with the mixed composition for a refrigerator or the refrigerator lubricating oil, the refrigerator lubricating oil of the present invention can suppress the swelling of the rubber member. Therefore, the refrigerator of the present invention can suppress leakage of the refrigerator lubricating oil and leakage of the refrigerant caused by the swelling of the rubber member.

The refrigerator of the present invention is preferably a compression refrigerator having at least a compressor, in which the rubber member is preferably a rubber provided in the compressor.

The rubber member is not particularly limited, examples of which include hydrogenated nitrile rubber (H-NBR), nitrile rubber (NBR), chloroprene rubber (CR), an ethylene-propylene-diene terpolymer (EPDM), silicone rubber, butyl rubber (IIR), styrene-butadiene rubber (SBR), urethane rubber (U), chlorosulfonated polyethylene (CSM), and fluorine rubber (FKM), and among these, hydrogenated nitrile rubber, chloroprene rubber, and an ethylene-propylene-diene terpolymer are preferably used.

The refrigerator has, for example, a compressor, a condenser, an expansion mechanism (such as an expansion valve), and an evaporator, or a compressor, a condenser, an expansion mechanism, a dryer, and an evaporator, by which a refrigeration cycle is constituted. The refrigerant used by mixing with the refrigerator lubricating oil is circulated in the refrigeration cycle, and repeatedly absorbs and releases heat. The refrigerator lubricating oil lubricates the refrigerator, for example, a sliding portion and the like of the compressor.

The refrigerator of the present invention can be applied, for example, to a refrigeration system, a hot water supply system, or a heating system, such as a car air-conditioner, a gas heat pump (GHP) system, an air conditioner, a refrigerating chamber, an automatic vending machine, a showcase, a hot water supplier, and a floor heating system, is preferably used in a car air-conditioner, such as an electric car air-conditioner and an open type car air-conditioner, and is particularly suitable for an open type car air-conditioner.

In the system, to which the refrigerator is applied, it is preferred that the water content in the system is 300 ppm by mass or less, and the residual air partial pressure in the system is 10 kPa or less. The water content is more preferably 200 ppm by mass or less, and the residual air partial pressure is more preferably 5 kPa or less.

EXAMPLES

The present invention will be described in more detail with reference to examples below, but the present invention is not limited to these examples.

Each property in the present invention was evaluated in the following manner.

[Evaluation Methods]

(1) 40° C. Kinetic Viscosity and 100° C. Kinetic Viscosity

The kinetic viscosity was measured with a glass capillary viscometer according to JIS K2283.

(2) Viscosity Index

The viscosity index was measured according to JIS K2283.

(3) Compatibility Test

The refrigerator lubricating oil and the refrigerant were charged in a two-layer separation temperature measuring tube (inner capacity: 10 mL) and retained in a thermostatic chamber. The two-layer separation temperature on the high temperature side was measured by increasing the temperature of the thermostatic chamber from room temperature (25° C.) to 80° C. at a rate of P° C. per minute. A specimen that was not separated into two layers until 80° C. is shown as "80<" in the table, and a specimen where the refrigerant and the refrigerator lubricating oil were incompatible is shown as "insoluble" therein.

The two-layer separation temperature on the low temperature side was measured by decreasing the temperature of the thermostatic chamber from room temperature (25° C.) to −50° C. at a rate of 1° C. per minute. A specimen that was not separated into two layers until −50° C. is shown as "−50>" in the table, and a specimen where the refrigerant and the refrigerator lubricating oil were incompatible is shown as "insoluble" therein.

The compatibility test was performed for the cases where the proportion of the refrigerant with respect to the total amount of the mixed composition for a refrigerator was 5% by mass, 10% by mass, 15% by mass, 20% by mass, and 30% by mass.

(4) Rubber Suitability Test

The swelling property of rubber with the mixed composition for a refrigerator was evaluated by immersing a rubber specimen having a dimension of 10 mm×10 mm and a thickness of 2 mm in the mixed composition for a refrigerator and subjecting to an autoclave test. In this test, the mixed composition for refrigerator used had a mass ratio of the refrigerator lubricating oil and the refrigerant of 20:8.6.

Rubber specimen: HNBR, CR, and EPDM
Test temperature: 175° C.
Test time: 24 hours
Test items: weight change rate (%), volume change rate (%)

In the rubber suitability test in the examples, a specimen where both the weight change rate and the volume change rate of the rubber were 0% or more and less than 6% was considered to be acceptable.

Examples 1 to 15 and Comparative Examples 1 to 19

The polyol esters of carboxylic acids and polyhydric alcohols shown in Table 1 were used as refrigerator lubricating oils. Mixed compositions for a refrigerator containing a refrigerator lubricating oil and a refrigerant were produced by using R1234yf as the refrigerant, and subjected to the compatibility test and the rubber suitability test. The polyol esters (refrigerator lubricating oils) were also measured for the kinetic viscosity and the viscosity index. The results are shown in Table 2.

TABLE 1

|  | Carboxylic acid | Polyhydric alcohol |
|---|---|---|
| Example 1 | branched C9 | PE |
| Example 2 | mixture of branched C9 and neoC10 (molar ratio: 8/2) | PE |
| Example 3 | mixture of branched C9 and neoC10 (molar ratio: 7/3) | PE |
| Example 4 | mixture of branched C9 and neoC10 (molar ratio: 6/4) | PE |
| Example 5 | mixture of branched C9 and neoC10 (molar ratio: 5/5) | PE |
| Example 6 | mixture of branched C9 and branched C12 (molar ratio: 8/2) | PE |
| Example 7 | mixture of branched C9 and branched C12 (molar ratio: 7/3) | PE |
| Example 8 | mixture of branched C9 and branched C12 (molar ratio: 6/4) | PE |
| Example 9 | mixture of branched C9 and branched C12 (molar ratio: 5/5) | PE |
| Example 10 | mixture of branched C9 and branched C16 (molar ratio: 8/2) | PE |
| Example 11 | branched C9 | DPE |
| Example 12 | branched C9 | mixture of PE and DPE (molar ratio: 9/1) |
| Example 13 | branched C9 | mixture of PE and DPE (molar ratio: 8/2) |
| Example 14 | branched C9 | mixture of PE and DPE (molar ratio: 7/3) |
| Example 15 | branched C9 | mixture of PE and DPE (molar ratio: 6/4) |
| Comparative Example 1 | neoC10 | PE |
| Comparative Example 2 | mixture of nC7 and C18' (molar ratio: 8/2) | PE |
| Comparative Example 3 | mixture of nC7 and C18T (molar ratio: 8/2) | PE |
| Comparative Example 4 | mixture of branched C8 and branched C16 (molar ratio: 8/2) | PE |
| Comparative Example 5 | mixture of branched C8 and branched C18 (molar ratio: 8/2) | PE |
| Comparative Example 6 | mixture of branched C8 and C18' (molar ratio: 8/2) | PE |
| Comparative Example 7 | mixture of branched C8, branched C9, and branched C24 (molar ratio: 1/8/1) | PE |
| Comparative Example 8 | mixture of branched C8, branched C9, and C24 (molar ratio: 5/4/1) | PE |
| Comparative Example 9 | mixture of branched C9 and branched C8 (molar ratio: 7/3) | PE |
| Comparative Example 10 | mixture of branched C9 and branched C8 (molar ratio: 8/2) | PE |
| Comparative Example 11 | mixture of branched C9 and branched C18 (molar ratio: 8/2) | PE |
| Comparative Example 12 | mixture of branched C9 and C18' (molar ratio: 8/2) | PE |
| Comparative Example 13 | mixture of branched C9 and branched C24 (molar ratio: 9/1) | PE |
| Comparative Example 14 | branched C16 | PE |
| Comparative Example 15 | branched C18 | PE |
| Comparative Example 16 | C18' | PE |
| Comparative Example 17 | nC6 | DPE |
| Comparative Example 18 | nC7 | DPE |
| Comparative Example 19 | mixture of branched C8 and branched C9 (molar ratio: 9/10) | mixture of PE and DPE (molar ratio: 5/1) |

The abbreviations in Table 1 are as follows.
nC6: n-hexanoic acid
nC7: n-heptanoic acid
branched C8: 2-ethylhexanoic acid
branched C9: 3,5,5-trimethylhexanoic acid
neoC10: neodecanoic acid
branched C12: 2-butyloctanoic acid
branched C16: isopalmitic acid
C18T: linoleic acid
C18': oleic acid
branched C18: isostearic acid
branched C24: isotetracosanoic acid
C24: tetracosanoic acid
PE: pentaerythritol
DPE: dipentaerythritol

TABLE 2

| | Kinetic viscosity (mm$^2$/g) | | Viscosity index | R1234yf two-layer separation temperature (° C.) | | | | |
|---|---|---|---|---|---|---|---|---|
| | | | | high temperature side | | | | |
| | 40° C. | 100° C. | | 5% | 10% | 15% | 20% | 30% |
| Example 1 | 124 | 12 | 84 | 80< | 68 | 64 | 74 | 80< |
| Example 2 | 129.6 | 11.87 | 75 | 77.7 | 76.5 | 76.1 | 77.5 | 80< |
| Example 3 | 162.7 | 12.91 | 61 | 80< | 75.0 | 68.3 | 74.3 | — |
| Example 4 | 285 | 17.45 | 51 | 71.7 | 65.3 | 63.4 | 64.0 | — |
| Example 5 | 278.9 | 16.55 | 41 | 80< | 69.0 | 67.0 | 67.9 | 80< |
| Example 6 | 93.72 | 10.39 | 91 | 75.5 | 65.8 | 59.6 | 70.1 | — |
| Example 7 | 87.65 | 10.2 | 97 | 70.5 | 62.5 | 59.3 | 59.0 | — |
| Example 8 | 82.88 | 9.935 | 99 | 67.8 | 54.7 | 47.6 | 47.4 | — |
| Example 9 | 80 | 9.8 | 100 | 64.0 | 48.0 | 35.0 | 35.0 | — |
| Example 10 | 90.91 | 10.7 | 101 | 66 | 51.8 | 45 | 44.7 | 48.9 |
| Example 11 | 462 | 27.92 | 84 | 60.4 | 48.2 | 42.3 | 41.5 | 43.1 |
| Example 12 | 139.5 | 12.94 | 84 | — | 65.8 | 61.8 | 70.8 | — |
| Example 13 | 157.5 | 13.98 | 84 | — | 63.6 | 59.7 | 67.5 | — |
| Example 14 | 178.2 | 15.13 | 84 | — | 61.4 | 57.5 | 64.3 | — |
| Example 15 | 202.2 | 16.41 | 84 | — | 59.2 | 55.3 | 61.0 | — |
| Comparative Example 1 | 675.1 | 38.01 | 93 | 46.0 | 35.6 | insoluble | insoluble | — |

TABLE 2-continued

| | | | | | | | | |
|---|---|---|---|---|---|---|---|---|
| Comparative Example 2 | 31.25 | 6.452 | 166 | insoluble | insoluble | insoluble | insoluble | — |
| Comparative Example 3 | 30.46 | 5.875 | 140 | insoluble | insoluble | insoluble | insoluble | — |
| Comparative Example 4 | 54.09 | 7.692 | 106 | 53.0 | insoluble | insoluble | insoluble | — |
| Comparative Example 5 | 54.71 | 7.870 | 110 | insoluble | insoluble | insoluble | insoluble | — |
| Comparative Example 6 | 53.47 | 8.277 | 127 | insoluble | insoluble | insoluble | insoluble | — |
| Comparative Example 7 | 93.34 | 11.04 | 103 | insoluble | insoluble | insoluble | insoluble | — |
| Comparative Example 8 | 66.51 | 8.902 | 108 | insoluble | insoluble | insoluble | insoluble | — |
| Comparative Example 9 | 78.4 | 9.152 | 90 | 80< | 80< | 80< | 80< | .80< |
| Comparative Example 10 | 95.43 | 10.29 | 87 | 80< | 78.6 | 77.9 | 78.8 | 80< |
| Comparative Example 11 | 90.42 | 10.93 | 106 | insoluble | insoluble | insoluble | insoluble | insoluble |
| Comparative Example 12 | 79.01 | 10.92 | 126 | insoluble | insoluble | insoluble | insoluble | insoluble |
| Comparative Example 13 | 101.4 | 11.47 | 100 | insoluble | insoluble | insoluble | insoluble | insoluble |
| Comparative Example 14 | 72.5 | 10.96 | 141 | insoluble | insoluble | insoluble | insoluble | insoluble |
| Comparative Example 15 | 74.75 | 11.57 | 148 | insoluble | insoluble | insoluble | insoluble | insoluble |
| Comparative Example 16 | 64.71 | 12.15 | 189 | insoluble | insoluble | insoluble | insoluble | insoluble |
| Comparative Example 17 | 71.39 | 9.591 | 113 | 78.0 | 74.8 | 75.3 | 77.3 | — |
| Comparative Example 18 | 51.92 | 8.703 | 146 | insoluble | insoluble | insoluble | insoluble | — |
| Comparative Example 19 | 83.33 | 9.609 | 91 | 77.6 | 73.7 | 72 | 72.3 | 80< |

| | R1234yf two-layer separation temperature (° C.) low temperature side | | | | | Rubber (H-NBR) | | Rubber (CR) | | Rubber (EPDM) | |
|---|---|---|---|---|---|---|---|---|---|---|---|
| | | | | | | weight change | volume change | weight change | volume change | weight change | volume change |
| | 5% | 10% | 15% | 20% | 30% | rate % | rate % | rate % | rate % | rate % | rate % |
| Example 1 | −50> | −50> | −50> | −50> | −50> | 5.5% | 5.1% | 5.8% | 5.1% | 5.2% | 4.8% |
| Example 2 | −50> | −50> | −50> | −50> | −50> | 5.1% | 5.1% | 5.4% | 5.1% | 4.9% | 4.8% |
| Example 3 | −50> | −50> | −50> | −50> | — | 4.8% | 5.0% | 5.0% | 5.0% | 4.6% | 4.8% |
| Example 4 | −50> | −50> | −46.5 | −44.3 | — | 3.5% | 3.6% | 3.6% | 3.7% | 3.4% | 3.5% |
| Example 5 | −50> | −50> | −45.3 | −43.9 | −42.5 | 2.7% | 2.7% | 2.8% | 2.8% | 2.6% | 2.6% |
| Example 6 | −50> | −45.6 | −41.7 | −41.5 | — | 5.4% | 5.4% | 5.6% | 5.4% | 5.1% | 5.2% |
| Example 7 | −42.9 | −26.8 | −19.2 | −17.0 | — | 4.8% | 5.2% | 5.1% | 5.2% | 4.6% | 4.9% |
| Example 8 | −32.5 | −10.3 | 1.6 | 2.9 | — | 4.2% | 4.9% | 4.4% | 4.9% | 4.0% | 4.7% |
| Example 9 | −22 | 5 | 20 | 22 | — | 3.6% | 4.2% | 3.8% | 4.2% | 3.4% | 4.0% |
| Example 10 | −20.4 | −0.3 | 9.7 | 9 | 1.2 | 3.9% | 4.6% | 4.1% | 4.8% | 3.8% | 4.4% |
| Example 11 | −50> | −41.4 | −35.8 | −34.8 | −36.9 | 2.6% | 3.0% | 2.7% | 4.6% | 2.5% | 2.8% |
| Example 12 | −50> | −50> | −50> | −50> | −50> | 3.9% | 4.0% | 4.0% | 4.1% | 3.7% | 3.8% |
| Example 13 | −50> | −50> | −50> | −50> | −50> | 3.7% | 3.9% | 3.9% | 4.0% | 3.6% | 3.7% |
| Example 14 | −50> | −50> | −50> | −50> | −50> | 3.6% | 3.8% | 3.8% | 4.6% | 3.4% | 3.6% |
| Example 15 | −50> | −50> | −50> | −50> | −50> | 3.4% | 3.7% | 3.6% | 4.6% | 3.3% | 3.5% |
| Comparative Example 1 | −28.3 | −8.0 | insoluble | insoluble | — | 2.8% | 3.5% | 2.9% | 3.6% | 2.8% | 3.4% |
| Comparative Example 2 | insoluble | insoluble | insoluble | insoluble | — | 7.7% | 8.4% | 8.5% | 9.3% | 7.4% | 8.0% |
| Comparative Example 3 | insoluble | insoluble | insoluble | insoluble | — | 9.0% | 10.8% | 10.8% | 13.0% | 8.7% | 10.5% |
| Comparative Example 4 | 0.0 | insoluble | insoluble | insoluble | — | 5.5% | 5.5% | 5.8% | 5.0% | 5.3% | 5.2% |
| Comparative Example 5 | insoluble | insoluble | insoluble | insoluble | — | 3.8% | 4.3% | 4.0% | 4.4% | 3.7% | 4.1% |
| Comparative Example 6 | insoluble | insoluble | insoluble | insoluble | — | 5.1% | 5.9% | 5.4% | 5.1% | 4.9% | 5.6% |
| Comparative Example 7 | insoluble | insoluble | insoluble | insoluble | — | 3.8% | 5.1% | 3.9% | 5.2% | 3.7% | 4.9% |
| Comparative Example 8 | insoluble | insoluble | insoluble | insoluble | — | 5.1% | 5.7% | 5.4% | 5.1% | 4.9% | 5.4% |
| Comparative Example 9 | −50> | −50> | −50> | −50> | −50> | 6.5% | 7.1% | 7.2% | 7.8% | 6.2% | 6.7% |
| Comparative Example 10 | −50> | −50> | −50> | −50> | −50> | 6.3% | 6.9% | 6.9% | 7.6% | 6.0% | 6.5% |

TABLE 2-continued

| | | | | | | | | | | | |
|---|---|---|---|---|---|---|---|---|---|---|---|
| Comparative Example 11 | insoluble | insoluble | insoluble | insoluble | insoluble | 3.8% | 4.3% | 3.9% | 4.5% | 3.6% | 4.1% |
| Comparative Example 12 | insoluble | insoluble | insoluble | insoluble | insoluble | 4.3% | 5.0% | 4.5% | 5.2% | 4.2% | 4.8% |
| Comparative Example 13 | insoluble | insoluble | insoluble | insoluble | insoluble | 4.1% | 4.0% | 4.3% | 4.0% | 3.9% | 3.8% |
| Comparative Example 14 | insoluble | insoluble | insoluble | insoluble | insoluble | −0.9% | −1.5% | 0.8% | 0.3% | −1.2% | −1.7% |
| Comparative Example 15 | insoluble | insoluble | insoluble | insoluble | insoluble | 1.8% | 2.3% | 1.9% | 2.3% | 1.7% | 2.2% |
| Comparative Example 16 | insoluble | insoluble | insoluble | insoluble | insoluble | −1.5% | −1.0% | 0.3% | 0.8% | −1.6% | −1.1% |
| Comparative Example 17 | −40.9 | −50> | −50> | −50> | — | 12.4% | 14.3% | 16.2% | 17.1% | 12.1% | 13.7% |
| Comparative Example 18 | insoluble | insoluble | insoluble | insoluble | — | 9.0% | 9.8% | 9.9% | 10.7% | 8.6% | 9.3% |
| Comparative Example 19 | −50< | −50> | −50> | −50> | −50> | 7.6% | 8.4% | 8.3% | 9.2% | 7.2% | 7.9% |

*The symbol "—" in the two-layer separation temperature means "not measured".

As shown in Examples 1 to 15 above, the use of the polyol ester (A) of the fatty acid (a1) consisting only of a fatty acid having a number of carbon atoms of 9 or the fatty acid (a1) containing a fatty acid having a number of carbon atoms of 9 in an amount of 50% by mol or more based on the total amount of the fatty acid (a1) with the balance being a fatty acid having a number of carbon atoms of from 10 to 16, and the polyol (a2) that is pentaerythritol and/or dipentaerythritol, as the base oil can properly suppress the swelling of the rubber members while providing good compatibility with the refrigerant of the unsaturated fluorinated hydrocarbon compound.

On the other hand, as shown in Comparative Examples, the use of a fatty acid having a number of carbon atoms of 8 or less or a fatty acid having a number of carbon atoms of 17 or more as the fatty acid (a1) lowers the compatibility and cannot sufficiently suppress the swelling of the rubber members, and thus cannot exhibit sufficient performance as the refrigerator lubricating oil for the refrigerant of the unsaturated fluorinated hydrocarbon compound.

INDUSTRIAL APPLICABILITY

The mixed composition for a refrigerator of the present invention can be applied to a car air-conditioner, a gas heat pump (GHP) system, an air conditioner, a refrigerating chamber, an automatic vending machine, a showcase, a hot water supplier, a floor heating system, and the like, and may be particularly preferably applied to a car air-conditioner, such as an electric car air-conditioner and an open type car air-conditioner.

The invention claimed is:

1. A lubricating method, the method comprising:
   lubricating a refrigerator with a refrigerator lubricating oil in the presence of a refrigerant comprising 2,3,3,3-tetrafluoropropene,
   wherein the refrigerator lubricating oil comprises:
      as a major component, a polyol ester (A) of a fatty acid (a1) that is a fatty acid having a number of carbon atoms of from 9 to 16 and has a content of a fatty acid having a number of carbon atoms of 9 of 50% by mole or more based on a total amount of the fatty acid (a1); and
      a polyol (a2) that is pentaerythritol, dipentaerythritol, or both, and
   wherein the refrigerator has provided therein a rubber member selected from the group consisting of a hydrogenated nitrile rubber (H-NBR), a chloroprene rubber (CR), an ethylene-propylene-diene terpolymer (EPDM), and combinations thereof.

2. The method of claim 1, wherein the refrigerant consists of the 2,3,3,3-tetrafluoropropene.

3. The method of claim 1, wherein the fatty acid (a1) consists of the fatty acid having a number of carbon atoms of 9.

4. The method of claim 1, wherein:
   the polyol ester (A) is a branched fatty acid (a1) having a number of carbon atoms of 9, and
   the polyol (a2) is pentaerythritol only or both pentaerythritol and dipentaerythritol.

5. The method of claim 1, wherein the polyol ester (A) is a branched fatty acid (a1) having a number of carbon atoms of 9.

6. The method of claim 5, wherein the polyol (a2) is both pentaerythritol and dipentaerythritol.

7. The method of claim 6, wherein an amount of the ester of pentaerythritol is larger than an amount of the ester of dipentaerythritol on molar basis.

8. The method of claim 7, wherein the molar ratio of the ester of pentaerythritol with respect to the ester of dipentaerythritol (pentaerythritol/dipentaerythritol) is from 80/20 to 60/40.

9. A refrigerator, comprising:
   a refrigerant comprising 2,3,3,3-tetrafluoropropene;
   a refrigerator lubricating oil comprising:
      as a major component, a polyol ester (A) of a fatty acid (a1) that is a fatty acid having a number of carbon atoms of from 9 to 16 and has a content of a fatty acid having a number of carbon atoms of 9 of 50% by mole or more based on a total amount of the fatty acid (a1); and
      a polyol (a2) that is pentaerythritol, dipentaerythritol, or both; and
   at least one rubber member selected from the group consisting of a hydrogenated nitrile rubber (H-NBR), a chloroprene rubber (CR), an ethylene-propylene-diene terpolymer (EPDM), and combinations thereof.

10. The refrigerator of claim 9, wherein the refrigerant consists of the 2,3,3,3-tetrafluoropropene.

11. The refrigerator of claim 9, wherein the fatty acid (a1) consists of the fatty acid having a number of carbon atoms of 9.

12. The refrigerator of claim 9, wherein:
the polyol ester (A) is a branched fatty acid (a1) having a number of carbon atoms of 9, and
the polyol (a2) is pentaerythritol only or both pentaerythritol and dipentaerythritol.

13. The refrigerator of claim 9, wherein the polyol ester (A) is a branched fatty acid (a1) having a number of carbon atoms of 9.

14. The refrigerator of claim 13, wherein the polyol (a2) is both pentaerythritol and dipentaerythritol.

15. The refrigerator of claim 14, wherein an amount of the ester of pentaerythritol is larger than an amount of the ester of dipentaerythritol on molar basis.

16. The refrigerator of claim 15, wherein the molar ratio of the ester of pentaerythritol with respect to the ester of dipentaerythritol (pentaerythritol/dipentaerythritol) is from 80/20 to 60/40.

\* \* \* \* \*